United States Patent [19]

Ruter

[11] Patent Number: 5,130,905
[45] Date of Patent: * Jul. 14, 1992

[54] COMBINED HEADLIGHT AND WINDSHIELD WIPER CONTROL

[76] Inventor: Lewis L. Ruter, 919 W. Broadway, Minneapolis, Minn. 55411

[*] Notice: The portion of the term of this patent subsequent to Sep. 24, 2008 has been disclaimed.

[21] Appl. No.: 763,282

[22] Filed: Sep. 20, 1991

Related U.S. Application Data

[63] Continuation-in-part of Ser. No. 615,355, Nov. 6, 1990, Pat. No. 5,051,873.

[51] Int. Cl.$^5$ .............................................. B60Q 1/00
[52] U.S. Cl. ...................................... 362/61; 362/80; 362/253; 362/802; 307/10.8; 315/82
[58] Field of Search .................. 362/61, 80, 253, 802, 362/276; 315/82, 83; 307/10.8

[56] References Cited

U.S. PATENT DOCUMENTS

| | | | |
|---|---|---|---|
| 3,500,119 | 3/1970 | Price | 307/10.8 |
| 3,500,120 | 3/1970 | Schultz | 315/82 |
| 3,519,837 | 7/1970 | Nolin et al. | 315/82 |
| 3,591,845 | 7/1971 | Vanderpoel | 315/82 |
| 3,600,596 | 8/1971 | Aloisantoni | 315/82 |
| 3,702,415 | 11/1972 | Schultz | 315/82 |
| 3,767,966 | 10/1973 | Bell | 315/83 |
| 3,824,405 | 7/1974 | Glaze | 307/10.8 |
| 3,909,619 | 9/1975 | Kniesly et al. | 307/10.8 |
| 4,009,363 | 2/1977 | Binegar | 307/10.8 |
| 4,010,380 | 3/1977 | Bailer et al. | 315/82 |
| 4,057,742 | 11/1977 | Binegar | 307/10.8 |
| 4,097,839 | 6/1978 | Lesiak | 315/82 |
| 4,236,099 | 11/1980 | Rosenblum | 315/83 |
| 4,330,716 | 5/1982 | Rust | 307/10.8 |
| 4,337,400 | 6/1982 | Hahn | 315/82 |
| 4,656,363 | 4/1987 | Carter et al. | 315/82 |
| 4,956,562 | 9/1990 | Benedict et al. | 307/10.3 |
| 4,985,660 | 1/1991 | Cronk | 307/10.8 |
| 5,027,001 | 6/1991 | Torbert | 307/10.8 |
| 5,051,873 | 9/1991 | Ruter | 362/61 |

FOREIGN PATENT DOCUMENTS

2064238 6/1981 United Kingdom .

Primary Examiner—Ira S. Lazarus
Assistant Examiner—Sue Hagarman
Attorney, Agent, or Firm—Burd, Bartz & Gutenkauf

[57] ABSTRACT

A vehicle windshield wiper and headlight control that only allows operation of the windshield wipers when the headlights are ON has a wiper control switch and a headlight switch connected to a battery, wiper motor, and headlights. The headlight switch has a pair of switches that are concurrently closed with a movable actuator so that the wiper motor only operates when the headlights are ON. An indicator light is associated with the headlight switch to advise the vehicle operator that the headlights must be ON before the windshield wipers can be operated. An alternate control has a relay operable to complete the wiper circuit or headlight circuit so that the headlights are ON when the windshield wipers are operated.

14 Claims, 5 Drawing Sheets

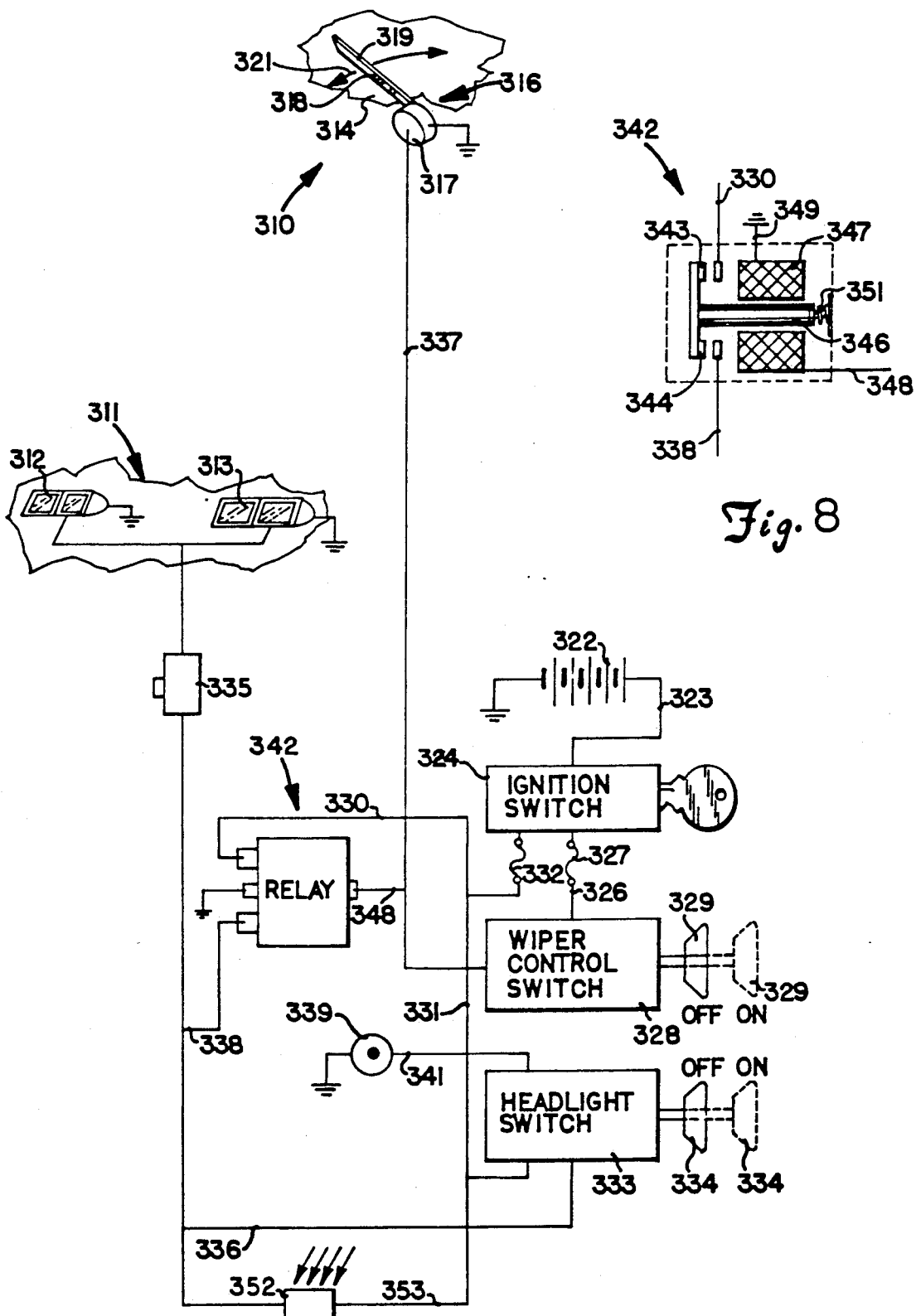

COMBINED HEADLIGHT AND WINDSHIELD WIPER CONTROL

CROSS REFERENCE TO RELATED APPLICATION

This application is a continuation-in-part of U.S. patent application Ser. No. 615,355 filed Nov. 6, 1990, U.S. Pat. No. 5,051,873.

TECHNICAL FIELD

The invention is in the field of motor vehicle electrical systems that control the operation of the headlights and windshield wipers of a vehicle such as an automobile, truck, tractor, snowmobile and like motor vehicles.

BACKGROUND OF THE INVENTION

Motor vehicles have been for many years equipped with headlights and windshield wipers to facilitate the observation of the roadway by the operator of the vehicle. Electrical and vacuum control systems have been used to operate the windshield wipers independent of the headlights. It is a common safety practice to have the headlights turned ON during inclement weather conditions such as rain, fog, hail, snow, sleet, mist and the like. The switches and controls for operating the headlights are separate and independent from the controls for the windshield wipers. This allows the operator of the vehicle to use the windshield wipers with the headlights OFF. A conscious effort must be made by the vehicle operator to turn the headlights ON in daylight conditions during inclement weather. A number of vehicles are operated with the windshield wipers ON and the headlights OFF. Some vehicle operators inadvertently leave the headlights ON after the vehicle has been parked. This will discharge the battery over an extended period of time and eventually result in a dead battery. The laws of some states require that the headlights of the vehicle be turned ON when the windshield wipers are operated. The operator of the vehicle must separately operate the windshield wiper controls and the headlight controls to achieve operation of the windshield wipers with the headlights ON.

SUMMARY OF INVENTION

The invention is directed to a combined windshield wiper and headlight control system that will allow operation of the windshield wipers when the headlights of the vehicle are ON. The control system operates through the switch for the headlights of the vehicle. The headlight switch must be turned ON to allow the windshield wipers to operate. In an alternative control system the windshield wiper switch is used to control both the windshield wipers and the headlights. The control system ensures that the headlights are ON when the windshield wipers are in operation.

In one embodiment of the combined windshield wiper and headlight control for a vehicle, the control includes a first switch that is operable to control the operation of the windshield wipers. This switch is connected to a power source such as a battery and an electric motor that operates the windshield wipers. A second switch operable to selectively turn the headlights ON and OFF is connected to the power source and the headlights. The second switch includes a pair of switches that separately control the headlights and the motor for the windshield wipers. Both of the pair of switches are normally open so that when the headlights are OFF the windshield wipers are inoperative. The second switch has an actuator which when moved to its ON position closes both the headlight and wiper switches so that the windshield wipers operate only during the time that the headlights are ON. When the actuator for the second switch is moved from the ON position to the OFF position, the headlights will be turned OFF and the operation of the windshield wipers will be terminated. An indicator incorporated into the second switch is used to provide a visual or sound signal which advises the operator that the first switch for the windshield wipers is inoperative during the time that the second switch for the headlights is OFF. Once the second switch is turned ON the indicator signal is terminated due to concurrent operation of the windshield wipers and the headlights.

In the second embodiment of the wiper control switch is provided with an indicator that advises the operator of the vehicle that the windshield wipers are operating with the headlights OFF. When the headlight switch is turned to the ON position the indicator is turned OFF or extinguished whereby the windshield wipers are operating at the time that the headlights are turned ON.

A third embodiment of the combined headlight and windshield wiper control has a headlight switch connected to a relay interposed in the line between the wiper control switch and the electric motor that drives the windshield wiper assembly. The headlight switch must be ON to activate the relay to close the electric circuit to the wiper motor. The headlights are ON when the windshield wipers are in operation.

The fourth embodiment of the combined headlight and windshield wiper control has a wiper control switch connected to a relay interpose in a line connecting the electric power source to the headlights. When the wiper control switch is turned ON the relay is activated to close the electric circuit to the headlights. The headlights are ON when the windshield wipers are in operation. The headlights and windshield wipers will be turned OFF when the wiper control switch is turned OFF. A light responsive switch connected in the headlight power line will keep the headlights ON in the event dark environmental conditions exist.

The combined windshield wiper and control system of the invention is automatic and operation in that it provides for the simultaneous operation of the windshield wipers only when the headlights of the vehicle are ON. The control system is easy to install and has a relatively low cost which provides a substantial enhancement of the safe operation of the vehicle.

DESCRIPTION OF DRAWING

FIG. 7 is a diagrammatic view of a fourth embodiment of the combined headlight and windshield wiper control of the invention; and FIG. 8 is a diagrammatic view of the relay used in the combined headlight and windshield wiper control of FIG. 7.

DESCRIPTION OF PREFERRED EMBODIMENTS

Figure 1:
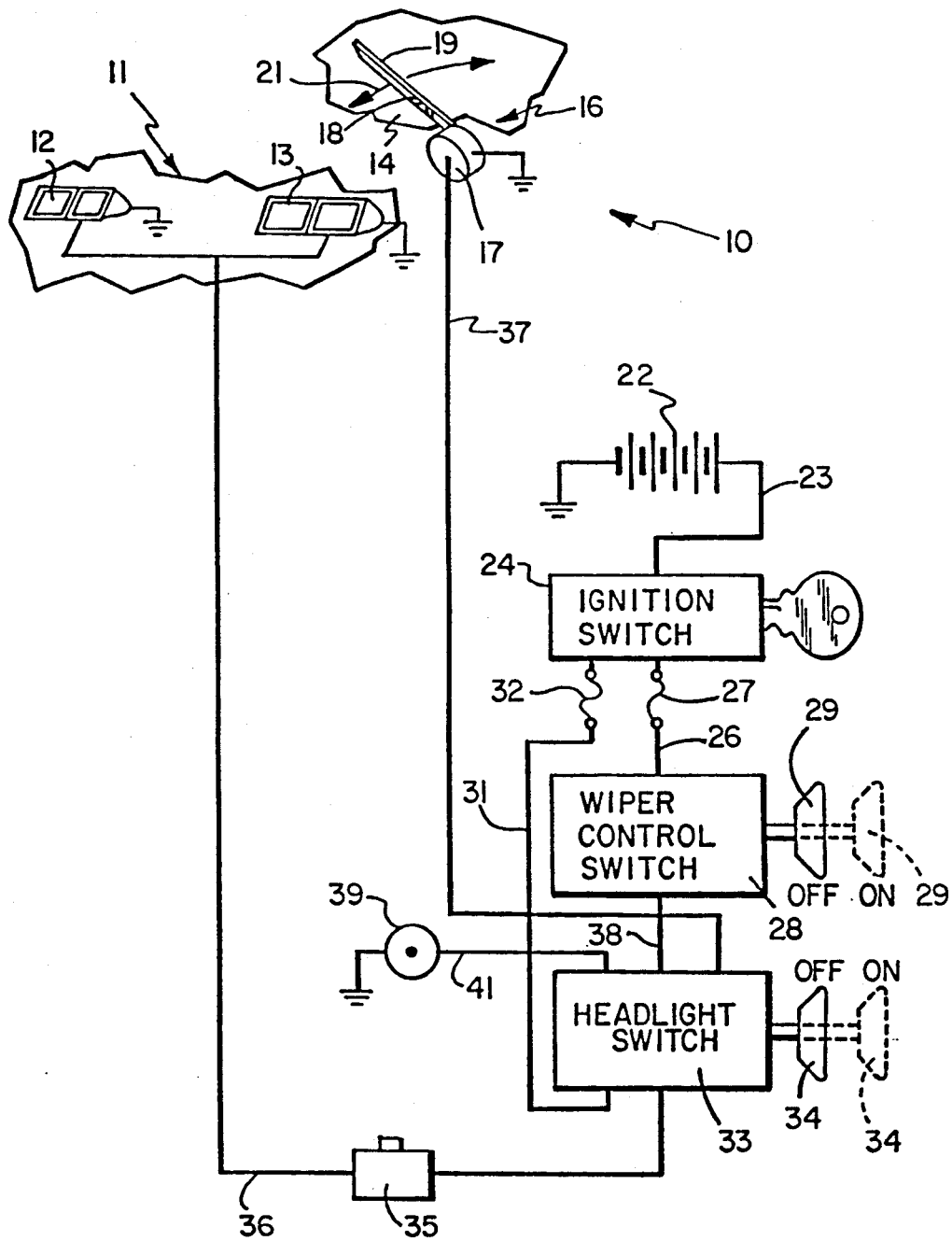
FIG. 1 is a diagrammatic view of the combined headlight and windshield wiper control of the invention.

Referring to FIG. 1 there is shown a front of vehicle 10, such as an automobile, truck, tractor, snowmobile or the like, having a front end 11 supporting a pair of headlights 12 and 13. A windshield 14 is located above headlights 12 and 13.

A wiper assembly, indicated generally at 16, is used to clear windshield 14 of rain, snow, sleet, fog, bugs and like particulate materials. Wiper assembly 16 conventionally has a pair of wiper blades that are operated with an electric gear head motor 17. Each wiper blade is operatively connected to motor 17 with an arm 18 to reciprocate a wiper blade 19, as indicated by arrow 21, to clear windshield 14. The linkage that operatively connects wiper motor 17 with the wiper blade is conventional structure and does not form part of the invention.

Vehicle battery 22, such as a 12 volt D.C. battery, is connected with a cable 23 to the ignition switch 24. The electric power source can be an alternator, generator and the like. An electrical conductor line 26 having a fuse 27 connects ignition switch 24 to wiper control switch 28. Switch 28 has an ON/OFF control or actuator 29 to control the operation as well as the speed of wiper assembly 16. Wiper control switch 28 is a conventional switch that may be operated in response to either reciprocal motion or rotational motion of actuator 29.

Ignition switch 24 is also connected with a conductor line 31 having a fuse 32 to a headlight switch 33. Switch 33 can be connected directly to battery 22. Switch 33 has a movable actuator 34 operable to selectively turn headlight switch ON and OFF. A conductor line 36 having a dimmer/bright switch 35 connects headlight switch 38 to headlights 12 and 13. Headlight switch 33 is also connected with a conductor line 37 to wiper motor 17. Wiper control switch 28 is further connected with a conductor line 38 to headlight switch 33. An indicator light 39, such as a red lamp, is connected with a conductor line 41 to headlight switch 43. Light 39 will illuminate when the wiper control switch is ON and the headlights switch is OFF. The light 39 indicates to the operator of the vehicle that the headlight switch 33 must be turned ON before the wiper motor 17 will operate the wiper assembly 16. Light 39 is a visual indicator of this condition. A buzzer, voice generator or digital read out can be used in lieu of light 39 to provide the vehicle operator with information indicating that the headlight switch 33 must be turned ON before the wiper assembly 16 can be operated.

Figure 2:
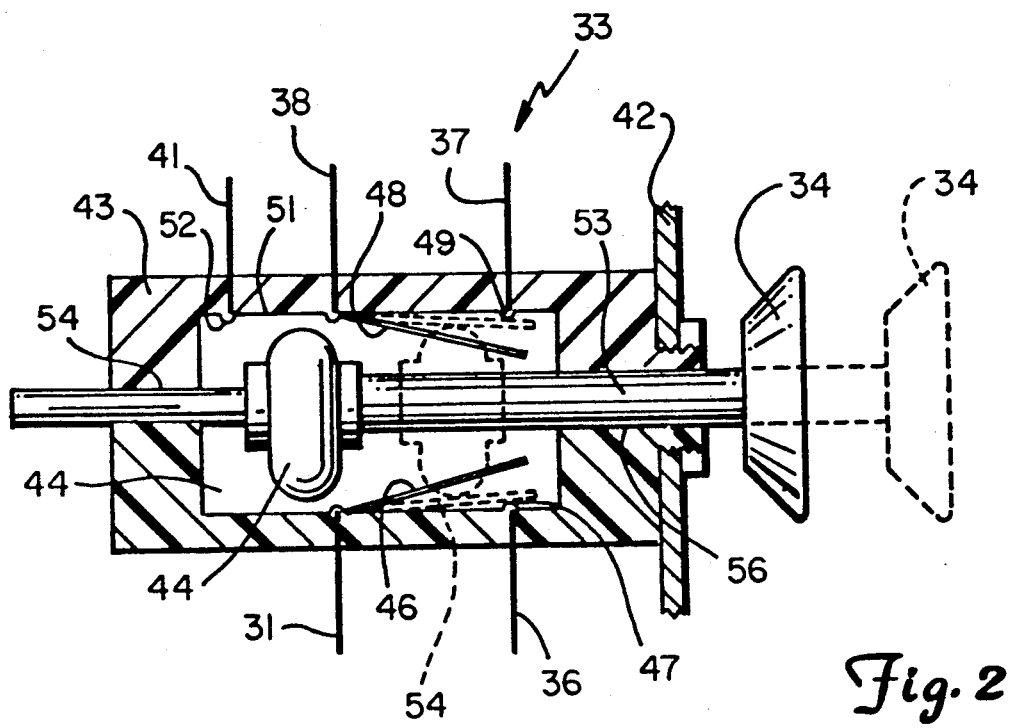
FIG. 2 is an enlarged diagrammatic sectional view of the headlight switch shown in FIG. 1.

Referring to FIG. 2, there is shown a diagrammatic view of headlight switch 33 mounted on vehicle dash panel 42. Switch 33 has a casing or body 43 and an internal chamber 44. A first switch located within chamber 44 is connected to line 31 that is operable to engage a contact 47 joined to line 36. First switch 46 is normally open when actuator 34 is in the OFF position. Opposite first switch 46 is a second switch 48 connected to line 38. Second switch 48 is adapted to engage a contact 49 joined to line 37. Second switch 48 is normally in the open position when switch actuator 34 is in the OFF position shown in full lines.

A third switch 51 is also connected to line 38. Third switch 51 is adapted to engage a contact 52 joined to line 41. Switch 51 is in a normally closed position when the actuator 34 is in the OFF position. When switch 28 is turned ON the circuit to light 39 is closed whereby the light is turned ON indicating that the wiper assembly 16 will not operate unless headlight switch 33 is also turned ON.

Switch actuator 34 has an elongated rod 53 that is slideably mounted on casing 43. Rod 53 has opposite ends located through bores 56 and 57 in housing 43. Detent structures (not shown) associated with rod 53 can be used to indicate the stop ON and stop OFF positions of the actuator 34.

Figure 3:
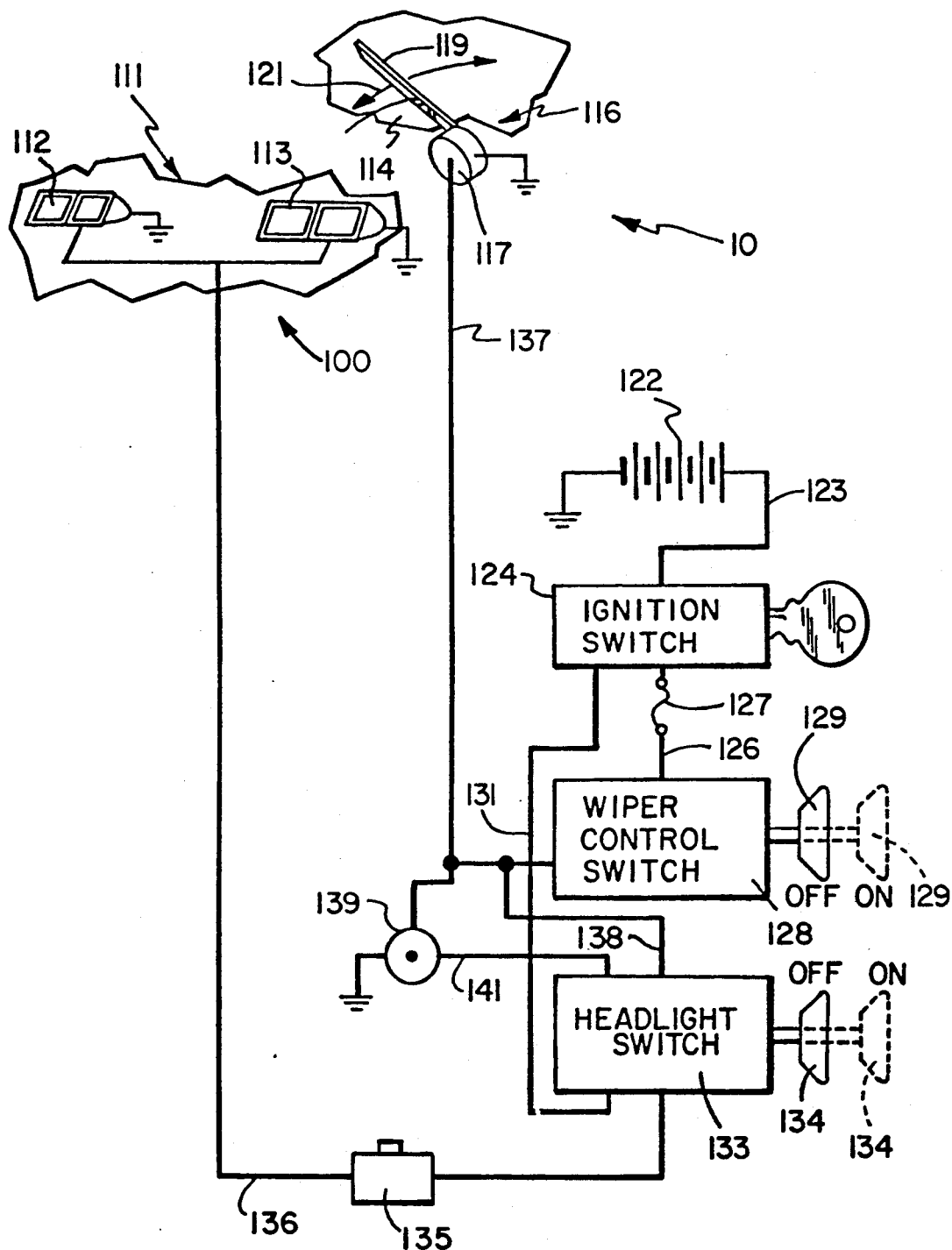
FIG. 3 is a diagrammatic view of a second embodiment of the combined headlight and windshield wiper control of the invention.

Referring to FIG. 3, there is shown a second embodiment of the vehicle headlight and windshield wiper control of the invention incorporated into a vehicle 100, such as an automobile, truck, tractor, snowmobile and the like. Vehicle 100 has a front end 111 accommodating a pair of headlights 112 and 113. A windshield 114 located above the vehicle hood is cleaned with a windshield wiper assembly indicated generally at 116. Wiper assembly 116 can have a pair of wiper blades that reciprocate across windshield 114 to remove water, fog, snow, sleet, ice, bugs and foreign matter from windshield 114. Wiper assembly 116 is operated with an electric motor 117, such as a gear head motor. An arm 118 is connected to the drive mechanism for motor 117. The wiper blade 119 is usually mounted on the end of arm 118 and engageable to the outside surface of windshield surface 114. On operation of motor 117, arm 118 reciprocates as indicated by arrow 121 thereby moving blade 119 relative to windshield 114.

Vehicle 100 has an electric power source 122, such as a 12 volt D.C. battery, connected with a cable 123 to an ignition switch 124. An electrical conductor line 126 having a fuse 127 is joined to the conventional wiper control switch 128. A second conductor line 137 connects switch 128 to wiper motor 117. When ignition switch 124 is ON and wiper actuator 129 is moved to the ON position, indicated in broken lines, motor 117 operates wiper assembly 116. Ignition switch 124 is connected with a conductor line 131 to a headlight control switch 133 having a moveable actuator 134. Switch 133 can be connected directly to battery 122. A dimmer/bright switch 135 is located in a conductor line 136 connecting switch 133 to headlights 112 and 113. Switch 133 is connected with conductor lines 138 and 141 to conductor line 127 leading to the wiper motor 117. A light 139 is located in line 141. Light 139 can be replaced with a buzzer, voice generator or a digital readout which indicates to the vehicle operator that wiper assembly 116 is operating when headlights 112 and 113 are OFF. The operator of the vehicle is then aware that the light control switch 133 should be turned on so that headlights 112 and 113 are ON at the same time that the wiper assembly 116 operates.

Figure 4:
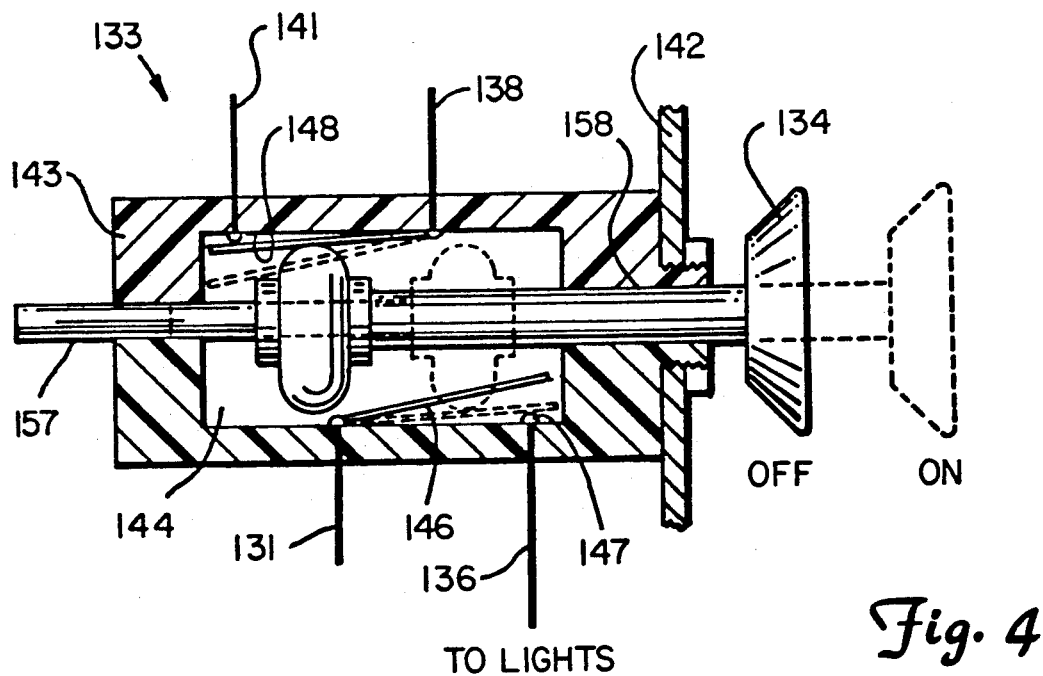
FIG. 4 is an enlarged sectional view of the headlight light switch shown in FIG. 3.

Referring to FIG. 4, wiper control switch 133 is mounted on the dash/panel 143 of the vehicle providing convenient operator access to actuator 134. Switch 133 has a casing or housing 143 having an internal chamber 144. A first switch 146 within chamber 144 is connected to line 131 and operable to engage a contact 147 joined to line 136. Switch 146 is normally open when actuator 134 is in the OFF position. Movement of actuator 34 to the ON position will close switch 146. Opposite first switch 146 is a second switch 148 connected to line 138 and operable to engage a contact 149 joined to line 141. Switch 148 is normally closed when the actuator 134 is in the OFF position. In the event that the wiper switch 128 is turned ON thereby operating the wiper assembly 116, the electric circuit to light 139 is closed so that the light will be ON to tell the operator to turn on the headlights. Switch 148 will open when actuator 134 is moved to the ON position as shown in broken lines. When switch 148 is open the light 139 will be OFF indicating that headlights 112 and 113 are ON.

Actuator 134 has an elongated linear rod 153 that is slideably located in bores 156 and 157 in opposite ends of housing 143. The middle portion of rod 153 carries a head 154 adapted to engage and operate the switches 146 and 148.

In use when light control switch 143 is in the OFF position second switch 148 is closed. Light 139 will be OFF if the wiper control switch 128 is OFF. When wiper control switch 128 is moved to the ON position, wiper assembly 116 will operate to clear windshield 116. Light 139 will be ON to indicate to the operator that the windshield wipers are operating with the headlights OFF. The operator then can move the light switch actuator to the ON position to turn headlights 112 and 113 ON so that headlights 112 and 113 are ON during the time that the windshield wipers are operating. When switch 134 is moved to the ON position second switch 148 will open thereby terminating the power to the light 139 since its function of making the operator aware that the headlights are not ON has been completed.

Figures 5, 6:
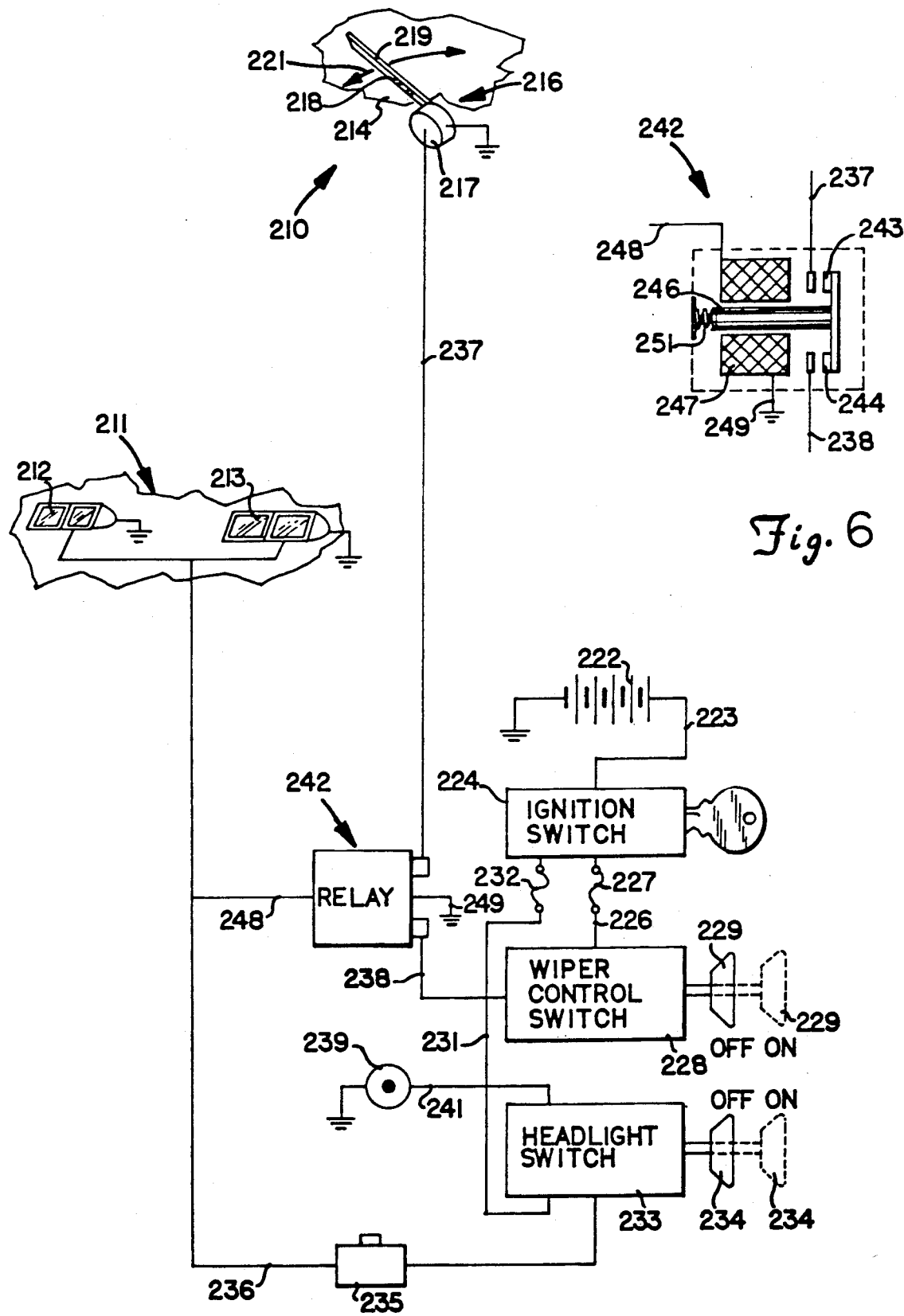
FIG. 5 is a diagrammatic view of a third embodiment of the combined headlight and windshield wiper control of the invention.
FIG. 6 is a diagrammatic view of the relay used in the combined headlight and windshield wiper control of FIG. 5.

Referring to FIG. 5, there is shown a front of a vehicle indicated generally at 210, such as a automobile, truck, tractor, snowmobile and the like, having a front end 211 supporting a pair of headlights 212 and 213. Vehicle has a windshield 214 located upwardly and above headlights 212 and 213. This structure is conventional vehicle structure and does not form part of the invention.

A windshield wiper assembly, indicated generally at 216, is used to clear windshield 214 of rain, fog, snow, sleet, dust, dirt, bugs and the like including particulate materials that may accumulate on windshield 214 during operation and parking of the vehicle. Wiper assembly 216 is a conventional structure having a pair of wiper blades that are operated with one or more electric motors, such as gear head motors, to reciprocate the blades over the windshield and thereby clear the windshield of foreign material. Each wiper blade is operatively connected to electric motor 217 with an arm 218 to reciprocate blade 219, as indicated by arrow 221, to clear windshield 214. The linkage that operatively connects wiper motor 217 with the wiper blade structure is a conventional arrangement of structure and does not form part of the invention.

Vehicle 210 has a conventional electric power source 222, such as a 12 volt D.C. battery connected with a battery cable 223 to ignition switch 224. Ignition switch 224 is operated with a conventional key to start the vehicle as well as make the electrical connections between the electrical circuits of the vehicle and battery 222. An electrical conductor line 226 having a fuse 227 connects ignition switch 224 to wiper control switch 228. Switch 228 is an ON/OFF switch having a linearly movable and rotatable actuator 229 to control the operation as well as the spread of wiper assembly 216. Wiper control switch 228 is a conventional electric switch that is operable in response to either reciprocal motion or rotational motion of actuator 229. In addition to controlling the ON/OFF electrical circuit to the wiper motor 217, switch 228 is operable to control the speed of the motor 217 as desired by the operator of the vehicle.

Ignition switch 224 is also connected with a conductor line 231 having a fuse 232 to a headlight switch 233. Switch 233 can be directly connected to battery 222 whereby it is not under the control of the ignition switch 224. Switch 233 has a linearly movably actuator 234 operable to selectively turn the headlight switch ON and OFF. A conductor line 236 having a dimmer/bright switch 235 connects headlight switch 238 to headlights 212 and 213. Headlight switch 233 is also connected with a conductor line 241 to a lamp or indicator 239 which advises the operator of the vehicle that the headlights are ON. Indicator 239 can indicate the bright light conditions of the headlights. The indicator 239 can also be used to indicate to the operator of the vehicle that headlight switch is ON. A buzzer, voice generator or digital readout can be used in lieu of a light 239 to provide the vehicle operator with information indicating that headlight switch 233 is ON.

Wiper control switch 228 is connected to lines 237 and 238 that lead to electric wiper motor 217 so that when switch 228 is ON wiper motor 217 is operating providing that relay 242 has been actuated to complete the electric circuit to wiper motor 217. Relay 242 is a solenoid operated switch that is normally open or OFF and energized with 12 volt D.C. electric power to close the switch to complete the electric circuit to the electric motor. Lines 237 and 238 are connected to separate terminals of relay 242, as seen in FIG. 6. Line 248 connected to line 236 is used to supply electric power to solenoid 247 of relay 242 which is connected to ground via line 249. When headlight switch 236 is ON, relay 242 is energized to close electric contacts 243 and 244 between lines 237 and 238 so that wiper control switch 228 when turned to the ON position can be used to operate wiper assembly 216. The wiper assembly 216 cannot be operated unless headlight switch 233 is ON.

Referring to FIG. 6, line 248 from headlight line 236 is connected to solenoid 247 of relay 242. The circuit is completed via ground line 249 so that when electric power is supplied to headlight line 236 solenoid 247 will move control rod 246 against the action of spring 251 to close contacts 243 and 244 thereby completing the electric circuit between wiper control switch 238 and wiper motor 217 thereby operate the wiper assembly to clear windshield 214 with headlights 212 and 213 ON. When headlight switch 233 is turned OFF solenoid 247 is deenergized so that contacts 243 and 244 will automatically open and thereby open the electric circuit to wiper motor 217 terminating operation of wiper assembly 216 and turning headlights 212 and 213 OFF.

The control apparatus for the headlights and wiper assembly will only allow wiper assembly 216 to operate when headlights 212 and 213 are ON. The control apparatus utilizes the conventional wiper control switch and headlight switch in conjunction with relay 242 interposed in the power line 237 between wiper control switch 228 and the electric motor 217 for the wiper control assembly 216. The relay 242 is controlled with the electric power derived from the conductor line 236 connecting headlights switch 233 with headlights 212 and 213. Relay 242 is operatively connected to wiper control switch 228 so that the wiper control actuator 229 must be moved to the ON position to supply electric power to wiper motor 217 when relay 242 has been actuated whereby the windshield wipers only operate when headlights 212 and 213 are ON.

Referring to FIG. 7, there is shown a front of a vehicle indicated generally at 310, such as an automobile, truck, tractor, snowmobile and the like, having a front end 311 supporting a pair of headlights 312 and 313. Vehicle 310 has a windshield 314 located upwardly and above headlights 312 and 313. This structure is conventional vehicle structure and does not form part of the invention.

A windshield wiper assembly, indicated generally at 316, is used to clear windshield 314 of rain, fog, snow, sleet, dust, dirt, bugs and like foreign materials including particulate materials that may accumulate on windshield 314 during operation and parking of the vehicle. Wiper assembly 316 is a conventional structure having a pair of wiper blades that are operated with one or more electric motors, such as gear head motors, to reciprocate the blades over the windshield and thereby clear the windshield of foreign material. Each wiper blade 319 is operatively connected to electric motor 317, such as a gear head D.C. electric motor, with an arm 318 to reciprocate blade 319, as indicated by arrow 321, to clear windshield 314. The linkage that operatively connects wiper motor 317 with the wiper blade structure is a conventional arrangement of structure and does not form part of the invention.

Vehicle 310 has a conventional electric power source 322, such as a 12 volt D.C. battery connected with a battery cable 323 to ignition switch 324. Ignition switch 324 is operated with a conventional key to start the vehicle as well as make the electrical connections between the electrical circuits of the vehicle and battery 322. An electrical conductor line 326 having a fuse 327 connects ignition switch 324 to wiper control switch 328. Switch 328 is an ON/OFF switch having a linearly movable and rotatable actuator 329 to control the operation as well as the speed of wiper assembly 316. Wiper control switch 328 is a conventional electric switch that is operable in response to either reciprocal motion or rotational motion of actuator 329 to control the operation of electric motor 317. In addition to controlling the ON/OFF electrical circuit to the wiper motor 317, switch 328 is operable to control the speed of the motor 317 as desired by the operator of the vehicle.

Ignition switch 324 is also connected with a conductor line 331 having a fuse 332 to a headlight switch 333. Switch 333 has a linearly movable and rotatable actuator 334 operable to selectively turn headlight switch ON or OFF. A conductor line 336 having a dimmer/bright switch 335 connects headlight switch 338 to headlights 312 and 313. Headlight switch 333 is also connected with a conductor line 341 to a lamp or indicator 239 which advises the operator of the vehicle that headlights 312 and 313 are ON or ON bright lights. The indicator 339 can indicate the bright light conditions of the headlights. The indicator 339 can also be used to indicate to the operator of the vehicle that headlight switch is ON. A buzzer, voice generator or digital readout can be used in lieu of light 339 to provide the vehicle operator with information indicating that headlight switch 333 is ON.

Wiper control switch 328 is connected to line 337 that leads to electric wiper motor 317 so that when switch 328 is ON, wiper motor 317 is operating and relay 342 is energized thereby closing the contacts 342 an 344 which turns headlights ON. Relay 342 is a solenoid operated 12 volt D.C. switch that is normally open. Lines 330 and 338 are connected to separate terminals of relay 342, as seen in FIG. 7. Line 348 connected to line 337 is used to supply electric power to solenoid 347 of relay 342 which is connected to ground via line 349. When wiper switch 338 is ON, relay 342 is energized to close the switch between the lines 330 and 338 so that wiper control switch when turned to the ON position can be used to concurrently operate wiper assembly 316 and turn headlights ON. The wiper assembly 316 only operates when headlights 312 and 313 are ON.

When wiper control switch 328 is turned OFF headlights 312 and 313 and wiper assembly 316 are both turned OFF. A light actuated switch 352 connected to a line 353 joining power line 331 to headlight line 336 operates to keep headlights ON in the event dark environmental conditions exist. Switch 352 will also automatically turn the headlights 312 and 313 when the switch is exposed to light of selected brightness, such as daylight.

Referring to FIG. 8, line 348 from wiper line 337 is connected to solenoid 347 of relay 342. The circuit is completed via ground line 349 so that when the power is supplied to wiper line 337 solenoid 347 will move control rod 346 against the action of spring 351 to close electric contacts 343 and 344 thereby completing the second electric headlight circuit between power line 330 and line 338 connected to headlight line 336. When wiper switch 328 is turned OFF solenoid 347 is deenergized so that contacts 343 and 344 will automatically open and thereby open the second headlight circuit to headlights 312 and 313.

The control apparatus for the headlights and wiper assembly will only allow wiper assembly 316 to operate when headlights are ON. The control apparatus utilizes the conventional wiper control switch and headlight switch in conjunction with relay 342 to add a second electric circuit connected to headlights 312 and 313 so that the headlights will always be ON during operation of wiper assembly 316. The relay 342 is controlled with the electric power derived from the conductor line connecting wiper switch 328 with wiper motor 317. Relay 342 is operatively connected to wiper control switch 328 so that actuator 329 must be moved to the ON position to supply electric power to wiper motor 317 and complete the electric circuit to the headlights whereby the headlights are ON when the windshield wipers operate.

While there has been shown and described preferred embodiments of the combined headlight and windshield wiper control of the invention it is understood that changes in the structure, electrical circuits and components of the circuit may be made by those skilled in the art without departing from the invention. For example, switches 24, 28, 33, 124, 128, 133, 224, 228, 233, 324, 328 and 333 can be key pad controls joined to a microprocessor that controls the operation of the controls so that the windshield wipers will only operate when the vehicle headlights are ON. The invention is defined in the following claims.

I claim:

1. A control apparatus for connecting an electric power source to vehicle headlights and electric powered means to operate the windshield wiper means of the vehicle only when the headlights are ON comprising: windshield wiper switch means connected to said electric power source operable in response to at least ON and OFF conditions to control the operation of the electric powered means to operate the windshield wiper means, headlight switch means operate to selectively turn the headlights ON and OFF, said headlight switch means having actuator means selectively moveable to ON and OFF positions to turn the headlights ON and OFF, and relay means connected to the windshield wiper switch, electric powered means, and headlight switch means, said relay means being actuated in response to the operation of the actuator means in the ON position to complete the electric circuit to the electric powered means when the windshield wiper switch means is in the ON condition whereby the electric powered means operates the windshield wipers only when the headlights are ON.

2. The apparatus of claim 1 including: the windshield wiper switch means is a switch having an actuator operable to control the operation of the electric powered means to operate the windshield wipers when the actuator means is in the ON position.

3. The apparatus of claim 1 wherein: the relay means is a solenoid operated switch that is open when the actuator means is in the OFF position and closed when the actuator means is in the ON position to complete the electric circuit to the electric powered means to operate the windshield wipers.

4. The apparatus of claim 1 including: indicator means connected to the headlight switch means to advise the vehicle operator that the actuator means of the headlight switch means must be ON before the windshield wipers can be operated.

5. The apparatus of claim 1 wherein: the relay means has electric contact means and a solenoid operable to close the electric contact means, said solenoid being electrically connected to the headlight switch means, and said electric contact means being electrically connected to the wiper switch means and electric powered means to operate the windshield wiper means.

6. A control apparatus for connecting an electric power source to vehicle headlights and electric powered means to operate the windshield wiper means of the vehicle only when the headlights are ON comprising: windshield wiper switch means connected to said electric power source operable in response to at least ON and OFF conditions to control the operation of the electric powered means to operate the windshield wiper means, said windshield wiper switch means having a wiper actuator selectively operable to turn the wiper switch means ON and OFF, headlight switch means operable to selectively turn the headlights ON and OFF, said headlight switch means having a headlight actuator selectively movable to ON and OFF positions to turn the headlights ON and OFF and relay means connected to the electric power source, headlights, and windshield wiper switch means, said relay means being actuated in response to operation of the wiper actuator in the ON position to complete an electric circuit to the headlights whereby the electric powered means operates the windshield wipers only when the headlights are ON.

7. The apparatus of claim 6 wherein: the relay means is a solenoid operated switch that is open when the wiper actuator is in the OFF position and closed when the wiper actuator is in the ON position to complete the electric circuit to the headlights.

8. The apparatus of claim 6 wherein: the relay means has electric contact means and a solenoid operable to close the electric contact means, said solenoid being electrically connected to the windshield wiper switch means, said electric contact means being electrically connected to the headlights and electric power source to turn the headlights ON when the wiper control switch is turned ON.

9. The apparatus of claim 6 including: a light responsive switch means connected to the electric power source and headlights operable to turn the headlights ON when the light intensity surrounding the light responsive switch means is below a selected level indicative of visually dark environmental conditions.

10. A control apparatus for connecting an electric power source to vehicle headlights and to electric motor means to operate the windshield wipers of the vehicle only when the headlights are ON comprising: a wiper switch operable to control the operation of the electric motor means to operate the windshield wipers, first conductor means connecting the wiper switch to the power source, a headlight switch operable to connect and disconnect the electric power source with the headlights, second conductor means connecting the headlight switch to the headlights, and relay means to complete the electric circuit to the electric motor means whereby the headlights and electric motor means are selectively and concurrently connected to the power source so that the electric motor means operates the windshield wipers only when the headlights are ON and disconnected from the power source, third conductor means connecting the second conductor means to the relay means whereby when the headlight switch is ON the headlight switch can control the operation of the electric motor means for operating the windshield wipers, third conductor means connecting the relay means to the wiper switch, and fourth conductor means connecting the relay means to the electric motor means whereby when the headlight switch is ON the relay is actuated to electrically connect the third and fourth conductor means and when the wiper switch is ON the headlights and electric motor means for the windshield wiper means are concurrently operated.

11. The apparatus of claim 10 including: indicator means connected to the headlight switch operable to advise the operator of the vehicle that the headlights are ON.

12. The apparatus of claim 11 wherein: the indicator means includes a light.

13. The apparatus of claim 10 wherein: the relay means is a solenoid operated switch that is open when the headlight actuator is in the OFF position and closed when the headlight actuator is in the ON position to complete the electric circuit to the electric powered means to operate the windshield wipers.

14. The apparatus of claim 10 wherein: the relay means has electric contact means and a solenoid operable to close the electric contact means, said solenoid means being electrically connected to the headlight switch means, and said electric contact means being electrically connected to the third conductor means and fourth conductor means to operate the windshield wipers.

* * * * *